(12) United States Patent
Petre et al.

(10) Patent No.: US 11,714,556 B2
(45) Date of Patent: Aug. 1, 2023

(54) SYSTEMS AND METHODS FOR ACCELERATING MEMORY TRANSFERS AND COMPUTATION EFFICIENCY USING A COMPUTATION-INFORMED PARTITIONING OF AN ON-CHIP DATA BUFFER AND IMPLEMENTING COMPUTATION-AWARE DATA TRANSFER OPERATIONS TO THE ON-CHIP DATA BUFFER

(71) Applicant: quadric.io, Inc., Burlingame, CA (US)

(72) Inventors: Marian Petre, Burlingame, CA (US); Aman Sikka, Burlingame, CA (US); Nigel Drego, Burlingame, CA (US); Veerbhan Kheterpal, Burlingame, CA (US); Daniel Firu, Burlingame, CA (US); Mrinalini Ravichandran, Burlingame, CA (US)

(73) Assignee: quadric.io, Inc., Burlingame, CA (US)

(*) Notice: Subject to any disclaimer, the term of this patent is extended or adjusted under 35 U.S.C. 154(b) by 0 days.

(21) Appl. No.: 17/902,985

(22) Filed: Sep. 5, 2022

(65) Prior Publication Data
US 2023/0083282 A1 Mar. 16, 2023

Related U.S. Application Data

(60) Provisional application No. 63/244,007, filed on Sep. 14, 2021.

(51) Int. Cl.
*G06N 3/08* (2023.01)
*G06F 3/06* (2006.01)
*G06F 13/16* (2006.01)

(52) U.S. Cl.
CPC .......... *G06F 3/0611* (2013.01); *G06F 3/0659* (2013.01); *G06F 3/0679* (2013.01); *G06F 13/1673* (2013.01)

(58) Field of Classification Search
CPC .................................. G06N 3/08; G06N 5/04
(Continued)

(56) References Cited

U.S. PATENT DOCUMENTS

| 4,954,963 A | * | 9/1990 | Penz | G01S 7/417 706/30 |
| 5,487,153 A | * | 1/1996 | Hammerstrom | G06F 15/8007 718/100 |

(Continued)

*Primary Examiner* — Titus Wong
(74) *Attorney, Agent, or Firm* — Padowithz Alce; Chandler Scheitlin Alce PLLC

(57) ABSTRACT

Systems and methods for implementing accelerated memory transfers in an integrated circuit includes configuring a region of memory of an on-chip data buffer based on a neural network computation graph, wherein configuring the region of memory includes: partitioning the region of memory of the on-chip data buffer to include a first distinct sub-region of memory and a second distinct sub-region of memory; initializing a plurality of distinct memory transfer operations from the off-chip main memory to the on-chip data buffer; executing a first set of memory transfer operations that includes writing a first set of computational components to the first distinct sub-region of memory, and while executing, using the integrated circuit, a leading computation based on the first set of computational components, executing a second set of memory transfer operations to the second distinct sub-region of memory for an impending computation.

20 Claims, 6 Drawing Sheets

(58) Field of Classification Search
USPC .......................................................... 706/206
See application file for complete search history.

(56) References Cited

U.S. PATENT DOCUMENTS

| | | | | |
|---|---|---|---|---|
| 5,909,681 | A  * | 6/1999 | Passera | G06F 18/23 |
| 6,678,813 | B1 * | 1/2004 | Le | G06F 5/065 |
| | | | | 711/147 |
| 2003/0212702 | A1* | 11/2003 | Campos | G06F 18/23213 |
| | | | | 707/999.102 |
| 2016/0342889 | A1* | 11/2016 | Thorson | G06N 5/04 |
| 2016/0342890 | A1* | 11/2016 | Young | G06N 3/08 |
| 2016/0342893 | A1* | 11/2016 | Ross | G06N 5/04 |
| 2016/0379108 | A1* | 12/2016 | Chung | G06N 3/045 |
| | | | | 706/27 |
| 2017/0103313 | A1* | 4/2017 | Ross | G06F 15/8046 |
| 2017/0103316 | A1* | 4/2017 | Ross | G06N 5/04 |

* cited by examiner

Configuring a Computation Network Graph S210

Optimizing a Computation Network Graph S212

Reserving Output for Subsequent Computations S214

Configuring an On-Chip Data Buffer S220

Coarse OCM Partitioning S222

Granular OCM Partitioning S224

Initializing and Enqueuing DMA Data Transfer and Parallelization with Computation Operations S230

Implementing OCM based on Computation Network Graph S240

FIGURE 2

Computation Network Graph

Splitting of Operations

SYSTEMS AND METHODS FOR ACCELERATING MEMORY TRANSFERS AND COMPUTATION EFFICIENCY USING A COMPUTATION-INFORMED PARTITIONING OF AN ON-CHIP DATA BUFFER AND IMPLEMENTING COMPUTATION-AWARE DATA TRANSFER OPERATIONS TO THE ON-CHIP DATA BUFFER

CROSS-REFERENCE TO RELATED APPLICATIONS

This application claims the benefit of U.S. Provisional Application No. 63/244,007, filed 14 Sep. 2021, which is incorporated in its entirety by this reference.

TECHNICAL FIELD

The one or more inventions described herein relate generally to the integrated circuitry field, and more specifically to a new and useful perception and dense algorithm processing integrated circuitry architecture in the integrated circuitry field.

BACKGROUND

Modern applications of artificial intelligence and generally, machine learning appear to be driving innovations in robotics and specifically, in technologies involving autonomous robotics and autonomous vehicles. Also, the developments in machine perception technology have enabled the abilities of many of the implementations in the autonomous robotics' and autonomous vehicles' spaces to perceive vision, perceive hearing, and perceive touch among many other capabilities that allow machines to comprehend their environments.

The underlying perception technologies applied to these autonomous implementations include a number of advanced and capable sensors that often allow for a rich capture of environments surrounding the autonomous robots and/or autonomous vehicles. However, while many of these advanced and capable sensors may enable a robust capture of the physical environments of many autonomous implementations, the underlying processing circuitry that may function to process the various sensor signal data from the sensors often lack in corresponding robust processing capabilities sufficient to allow for high performance and real-time computing of the sensor signal data.

The underlying processing circuitry often include general purpose integrated circuits including central processing units (CPUs) and graphic processing units (GPU). In many applications, GPUs are implemented rather than CPUs because GPUs are capable of executing bulky or large amounts of computations relative to CPUs. However, the architectures of most GPUs are not optimized for handling many of the complex machine learning algorithms (e.g., neural network algorithms, etc.) used in machine perception technology. For instance, the autonomous vehicle space includes multiple perception processing needs that extend beyond merely recognizing vehicles and persons. Autonomous vehicles have been implemented with advanced sensor suites that provide a fusion of sensor data that enable route or path planning for autonomous vehicles. But, modern GPUs are not constructed for handling these additional high computation tasks.

At best, to enable a GPU or similar processing circuitry to handle additional sensor processing needs including path planning, sensor fusion, and the like, additional and/or disparate circuitry may be assembled to a traditional GPU. This fragmented and piecemeal approach to handling the additional perception processing needs of robotics and autonomous machines results in a number of inefficiencies in performing computations including inefficiencies in sensor signal processing.

Accordingly, there is a need in the integrated circuitry field for an advanced integrated circuit and processing techniques that are capable of high performance and real-time processing and computing of routine and advanced sensor signals for enabling perception of robotics or any type or kind of perceptual machine.

The inventors of the inventions described in the present application have designed an integrated circuit architecture and one or more processing techniques that allow for enhanced sensor data processing capabilities and have further discovered related methods for implementing the integrated circuit architecture for several purposes including for enabling perception of robotics and various machines.

BRIEF SUMMARY OF THE INVENTION(S)

In one embodiment, a method of intelligently controlling a flow of data within an integrated circuit includes implementing the integrated circuit comprising an array of processing cores, an on-chip data buffer in operable communication with the array of processing cores, and an off-chip main memory in operable communication with the on-chip data buffer; configuring a region of memory of the on-chip data buffer based on at least one attribute of a neural network computational graph, wherein configuring the region of memory includes: partitioning the region of memory of the on-chip data buffer to include a first distinct sub-region of memory configured to receive prerequisite computational components for a target active computation associated with the neural network computational graph; and partitioning the region of memory of the on-chip data buffer to include a second distinct sub-region of memory configured to receive prerequisite computational components for an impending computation succeeding the target active computation of a predetermined sequence of computations; initializing, by a memory transfer scheduling circuit, a plurality of distinct memory transfer operations from the off-chip main memory to the on-chip data buffer based on an encoding of the neural network computational graph and memory attributes of the on-chip data buffer; executing a first set of memory transfer operations of the plurality of distinct memory transfer operations that includes writing a first set of prerequisite computational components to the first distinct sub-region of memory, wherein writing the first set of prerequisite computational components to the first distinct sub-region of memory causes the integrated circuit to execute, by at least one processing core of the array of processing cores, a leading computation associated with the first set of prerequisite computational components, and while executing the leading computation, simultaneously executing a second set of memory transfer operations of the plurality of distinct memory transfer operations to accelerate an enqueuing of a second set of prerequisite computational components within the second distinct sub-region of memory for the impending computation.

In one embodiment, the method includes wherein the first set of prerequisite computational components includes (i) an input component and (ii) a distinct set of weights associated with a target layer of the neural network computational graph, and in response to writing the input component and the distinct set of weights to the first distinct sub-region of memory of the on-chip data buffer: executing, by the at least one processing core of the array of processing cores, the leading computation based on the input component and the distinct set of weights.

In one embodiment, the method further includes sub-partitioning the first distinct sub-region of memory of the on-chip data buffer into a plurality of distinct memory slices, wherein each distinct memory slice of the plurality of distinct memory slices corresponds to a distinct prerequisite computational component type.

In one embodiment, the method includes wherein a first memory slice of the plurality of distinct memory slices is allocated to receive an input-type prerequisite computational component, wherein the input-type prerequisite computational component comprises a n-dimensional tensor of input data, and a second memory slice of the plurality of distinct memory slices is allocated to receive a weight-type prerequisite computational component, wherein the weight-type prerequisite computational component comprises a distinct set of weights associated with a target layer of the neural network computational graph.

In one embodiment, the method further includes sub-partitioning the first distinct sub-region of memory of the on-chip data buffer into a plurality of distinct memory slices, wherein: a first memory slice of the plurality of distinct memory slices is allocated to receive a prerequisite computational component type of a first type, a second memory slice of the plurality of distinct memory slices is allocated to receive a prerequisite computational component type of a second type distinct from the first type, and a third memory slice of the plurality of distinct memory slices is allocated to receive a prerequisite computational component type of a third type distinct from the first type and the second type.

In one embodiment, the method further includes computing an n-dimensional output data tensor based on the executing, by the at least one processing core of the array of processing cores, the leading computation; and in response to computing the n-dimensional output data tensor: writing the n-dimensional output data tensor to the second distinct sub-region of memory of the on-chip data buffer, and executing, using one or more processing cores of the array of processing cores, the impending computation based on the n-dimensional output data tensor and the second set of prerequisite computational components required for the impending computation.

In one embodiment, the method further wherein a majority of the second set of prerequisite computational components required for the impending computation is stored within the second distinct sub-region of the on-chip data buffer prior to a completion of the leading computation, and the storing of the majority of the second set of prerequisite computational components minimizes a latency between a completion of the leading computation and a start of the impending computation by one or more processing cores of the array of processing cores.

In one embodiment, the method further includes in response to a completion of the impending computation via the one or more processing cores of the array of processing cores: removing or deleting one or more prerequisite computational components of the second set of prerequisite computational components from the second distinct sub-region of memory of the on-chip data buffer.

In one embodiment, the method includes wherein each prerequisite computational component of the second set of prerequisite computational components is encoded in the second distinct sub-region of memory of the on-chip data buffer prior to the at least one processing core of the array of processing cores completing the leading computation.

In one embodiment, the method further includes in response to a completion of the leading computation using the at least one processing core of the array of processing cores: removing or deleting one or more prerequisite computational components of the first set of prerequisite computational components from the first distinct sub-region of memory of the on-chip data buffer.

In one embodiment, a method of intelligently controlling a flow of data within an integrated circuit includes identifying a representation of a neural network computation graph comprising a plurality of neural network operations; configuring an on-chip data buffer based on the neural network computation graph, wherein configuring the on-chip data buffer includes: partitioning a region of memory of the on-chip data buffer to include a first distinct sub-region of memory configured to receive computational components for a target compute scope associated with the neural network computation graph; and partitioning the region of memory of the on-chip data buffer to include a second distinct sub-region of memory configured to receive computational components for a succeeding compute scope in a predetermined sequence of computation scopes associated with the plurality of neural network operations; executing a first set of memory transfer operations that writes a first set of computational components to the first distinct sub-region of memory, wherein writing the first set of computational components to the first distinct sub-region of memory causes the integrated circuit to execute, by at least one processing core of an array of processing cores, the target compute scope based on at least a subset of the first set of computational components, and while executing the target compute scope, simultaneously executing a second set of memory transfer operations that accelerates an enqueuing of a second set of computational components by writing the second set of computational components to the second distinct sub-region of memory required for the succeeding compute scope.

In one embodiment, the method further includes automatically generating an optimized neural network computation graph based on the neural network computation graph, wherein automatically generating the optimized neural network computation graph includes splitting at least one computation component of the neural network computation graph into a plurality of distinct sub-computations, and the representation of the neural network computation graph comprises the optimized neural network computation graph.

In one embodiment, the method includes wherein the first set of computational components includes (i) an input component, (ii) a first distinct set of weights associated with a first target layer of the neural network computation graph, and (iii) a second distinct set of weights associated with a second target layer downstream of the first target layer.

In one embodiment, the method further includes computing an n-dimensional output data tensor based on the executing, by the at least one processing core of the array of processing cores, the target compute scope; and in response to computing the n-dimensional output data tensor: writing the n-dimensional output data tensor to the second distinct sub-region of memory of the on-chip data buffer, and based on the writing, executing, using one or more processing cores of the array of processing cores, the succeeding compute scope based on the n-dimensional output data tensor and the second set of computational components.

In one embodiment, a method of intelligently controlling a flow of data within an integrated circuit includes identifying a neural network computation graph; configuring an on-chip data buffer based on the neural network computation graph, wherein configuring the on-chip data buffer includes: partitioning a region of memory of the on-chip data buffer to include a first distinct sub-region of memory configured to receive prerequisite computational components for a target computation associated with the neural network computation graph; and partitioning the region of memory of the on-chip data buffer to include a second distinct sub-region of memory configured to receive prerequisite computational components for an impending, non-active computation succeeding the target computation; executing a first set of memory transfer operations that writes a first set of prerequisite computational components to the first distinct sub-region of memory, wherein writing the first set of prerequisite computational components to the first distinct sub-region of memory causes the integrated circuit to execute, by at least one processing core of an array of processing cores, the target computation based on, at least, the first set of prerequisite computational components, and while executing the target computation, simultaneously executing a second set of memory transfer operations that writes a second set of prerequisite computational components to the second distinct sub-region of memory for the impending, non-active computation.

In one embodiment, the method includes wherein the on-chip data buffer is in operable communication with the array of processing cores.

In one embodiment, the method includes wherein the first set of prerequisite computational components includes (i) an input component and (ii) a distinct set of weights associated with a target layer of the neural network computation graph, and in response to writing the input component and the distinct set of weights to the first distinct sub-region of memory of the on-chip data buffer: executing, by the at least one processing core of the array of processing cores, the target computation based on the input component and the distinct set of weights.

In one embodiment, the method further includes computing an output data tensor based on the executing, by the at least one processing core of the array of processing cores, the target computation; in response to computing the output data tensor, writing the output data tensor to the second distinct sub-region of memory of the on-chip data buffer; and in response to writing the output data tensor to the second distinct sub-region of memory of the on-chip data buffer, executing, using one or more processing cores of the array of processing cores, the impending, non-active computation based on the output data tensor and the second set of prerequisite computational components.

In one embodiment, the method includes wherein the writing of each prerequisite computational component of the second set of prerequisite computational components to the second distinct sub-region of memory of the on-chip data buffer is finished prior to a completion of the leading computation by the at least one processing core of the array of processing cores.

In one embodiment, the method includes wherein a majority of the second set of prerequisite computational components required for the impending, non-active computation is stored within the second distinct sub-region of the on-chip data buffer prior to a completion of the target computation, and the storing of the majority of the second set of prerequisite computational components minimizes a latency between a completion of the target computation and a start of the impending, non-active computation by the array of processing cores.

BRIEF DESCRIPTION OF THE FIGURES

FIG. 2 illustrates a method 200 for configuring on-chip data buffer and executing data transfer operations onto the on-chip data buffer in accordance with one or more embodiments of the present application;

DESCRIPTION OF THE PREFERRED EMBODIMENTS

Figure 1:
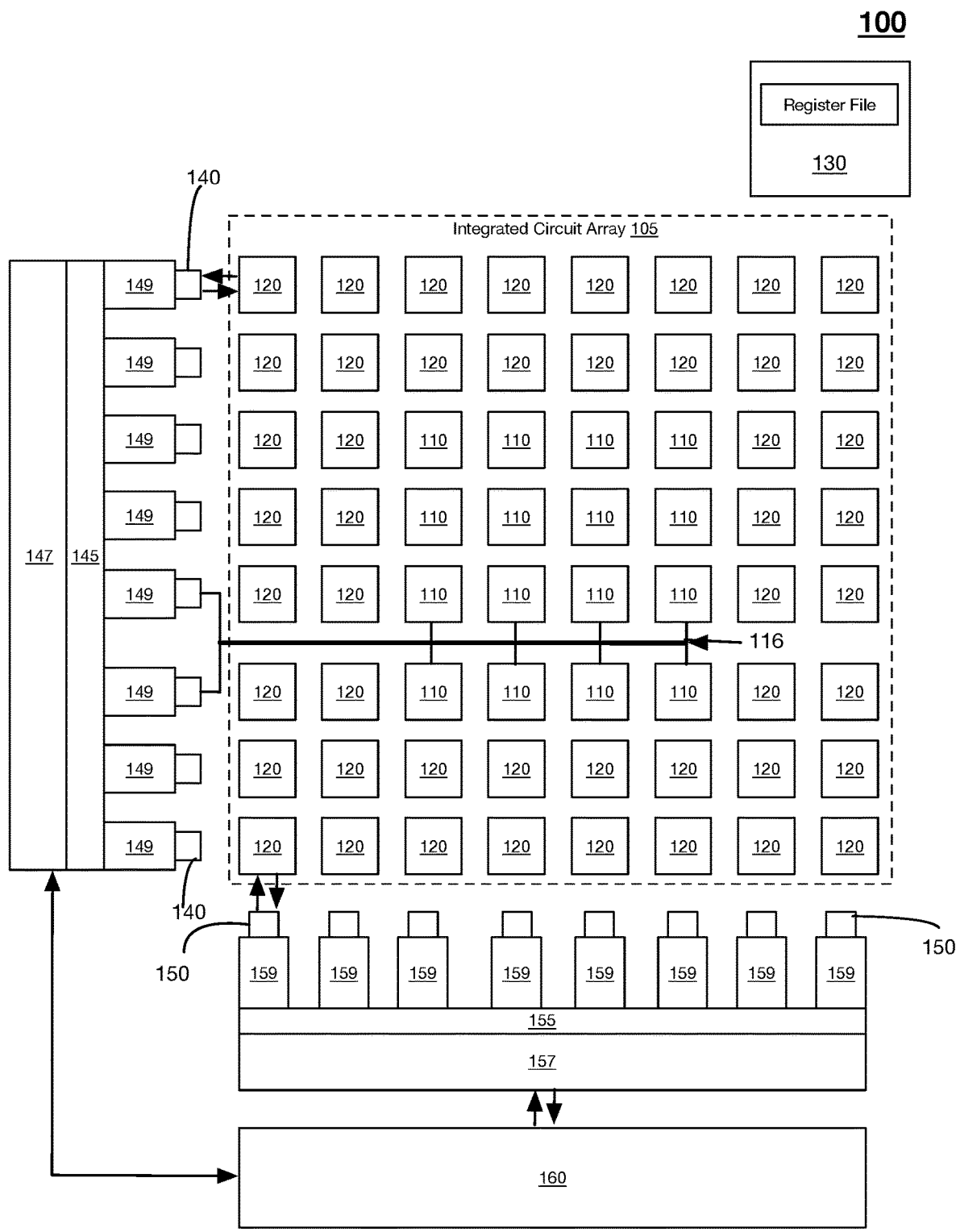
FIG. 1 illustrates a schematic of a system 100 in accordance with one or more embodiments of the present application.

The following description of preferred embodiments of the present application are not intended to limit the inventions to these preferred embodiments, but rather to enable any person skilled in the art of to make and use these inventions.

Overview

In one or more embodiments of the present application, the systems and techniques described herein may allow for enhanced scheduling and execution of data transfers and computations, in parallel, that reduces latency in the one or more processes of an integrated circuit. In such embodiments, a scheduling of a plurality of memory transfers of inputs and outputs of computations of a computations network graph may be made in such a manner that enables overlaps with computations.

In the one or more embodiments, the methods and systems may function to configure an on-chip memory or data buffer that operably interfaces and/or communicates with an array processing cores of the integrated circuit. In embodiments such as these, the inputs for compute are preferably stored in the OCM and are sourced to the array processing cores and the outputs of the computers are preferably transferred from the array processing cores to and stored by the OCM. Since in some circumstances, the content of the OCM may function to dictate the amount of compute that can be performed by the array processing cores. Because of this, the one or more embodiments of the present application provide systems and techniques that configures the OCM to optimize for both memory transfers and computations. That is, rather than sequential memory transfers to the OCM and subsequent computations based on the memory content of the OCM, the memory transfers are optimized for multiple parallel transfers into the OCM from a main memory (e.g., off-chip main memory) based on the computation requirements of the array processing cores and the computations of the array processing cores may be accelerated based on partial dependency encodings of the OCM that allow computations to be performed by the OCM with only partial inputs stored in the OCM.

At least a few technical benefits of the above-noted embodiments of the present application includes the continuous and uninterrupted computations of the array processing cores based on the encoded partial dependencies of the OCM and the continuous and uninterrupted memory transfers of inputs and outputs without the need to wait on the completion of the one or more computations at the array processing cores.

It shall also be recognized that the one or more embodiments of the present application may be implemented in any suitable processing environment including, but not limited to, within one or more IMDs and/or any suitable processing circuit.

The mesh architecture defined by the plurality of processing elements in the array core preferably enable in-memory computing and data movement, as described in U.S. Pat. No. 10,365,860 and U.S. patent application Ser. No. 16/292,537, which are incorporated herein in their entireties by this reference and further, enable a core-level predication and a tile-level predication.

1. A System Architecture of a Dense Algorithm and/or Perception Processing Circuit (Unit)

As shown in FIG. 1, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159, as described in U.S. Pat. Nos. 10,365,860, 10,691,464, and U.S. patent application Ser. No. 16/292,537, which are all incorporated herein in their entireties by this reference.

The integrated circuit 100 preferably functions to enable real-time and high computing efficiency of perception data, sensor data, and/or the like. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably, includes a register file 112 having a large data storage capacity (e.g., 1024 kb, etc.) and an arithmetic logic unit (ALU) 118 or any suitable digital electronic circuit that performs arithmetic and bitwise operations on integer binary numbers. In a preferred embodiment, the register file 112 of an array core 110 may be the only memory element that the processing circuits of an array core 110 may have direct access to. An array core 110 may have indirect access to memory outside of the array core and/or the integrated circuit array 105 (i.e., core mesh) defined by the plurality of border cores 120 and the plurality of array cores 110.

The register file 112 of an array core 110 may be any suitable memory element or device, but preferably comprises one or more static random-access memories (SRAMs). The register file 112 may include a large number of registers, such as 1024 registers, that enables the storage of a sufficiently large data set for processing by the array core 110. Accordingly, a technical benefit achieved by an arrangement of the large register file 112 within each array core 110 is that the large register file 112 reduces a need by an array core 110 to fetch and load data into its register file 112 for processing. As a result, a number of clock cycles required by the array core 112 to push data into and pull data out of memory is significantly reduced or eliminated altogether. That is, the large register file 112 increases the efficiencies of computations performed by an array core 110 because most, if not all, of the data that the array core 110 is scheduled to process is located immediately next to the processing circuitry (e.g., one or more MACs, ALU, etc.) of the array core 110. For instance, when implementing image processing by the integrated circuit 100 or related system using a neural network algorithm(s) or application(s) (e.g., convolutional neural network algorithms or the like), the large register file 112 of an array core may function to enable a storage of all the image data required for processing an entire image. Accordingly, a majority, most or if not, all layer data of a neural network implementation (or similar compute-intensive application) may be stored locally in the large register file 112 of an array core 110 with the exception of weights or coefficients of the neural network algorithm(s), in some embodiments. Accordingly, this allows for optimal utilization of the computing and/or processing elements (e.g., the one or more MACs and ALU) of an array core 110 by enabling an array core 110 to constantly churn data of the register file 112 and further, limiting the fetching and loading of data from an off-array core data source (e.g., main memory, periphery memory, etc.).

By comparison, to traverse a register file in a traditional system implemented by a GPU or the like, it is typically required that memory addresses be issued for fetching data from memory. However, in a preferred embodiment that implements the large register file 112, the (raw) input data within the register file 112 may be automatically incremented from the register file 112 and data from neighboring core(s) (e.g., array cores and/or border cores) are continuously sourced to the register file 112 to enable a continuous flow to the computing elements of the array core 110 without an express need to make a request (or issuing memory addresses) by the array core 110.

While in some embodiments of the present application, a predetermined data flow scheduled may mitigate or altogether, eliminate requests for data by components within the integrated circuit array 105, in a variant of these embodiments traditional random memory access may be achieved by components of the integrated circuit array 105. That is, if an array core 110 or a border core 120 recognizes a need for a random piece of data for processing, the array core 110 and/or the border 120 may make a specific request for data from any of the memory elements within the memory hierarchy of the integrated circuit 100.

An array core 110 may, additionally or alternatively, include a plurality of multiplier (multiply) accumulators (MACs) 114 or any suitable logic devices or digital circuits that may be capable of performing multiply and summation functions. In a preferred embodiment, each array core 110 includes four (4) MACs and each MAC 114 may be arranged at or near a specific side of a rectangular shaped array core 110. While, in a preferred embodiment each of the plurality of MACs 114 of an array core 110 may be arranged near or at the respective sides of the array core 110, it shall be known that the plurality of MACs 114 may be arranged within (or possibly augmented to a periphery of an array core) the array core 110 in any suitable arrangement, pattern, position, and the like including at the respective corners of an array core 110. In a preferred embodiment, the arrangement of the plurality of MACs 114 along the sides of an array core 110 enables efficient inflow or capture of input data received from one or more of the direct neighboring cores (i.e., an adjacent neighboring core) and the computation thereof by the array core 110 of the integrated circuit 100.

Accordingly, each of the plurality of MACs 114 positioned within an array core 110 may function to have direct communication capabilities with neighboring cores (e.g., array cores, border cores, etc.) within the integrated circuit 100. The plurality of MACs 114 may additionally function to execute computations using data (e.g., operands) sourced from the large register file 112 of an array core 110. However, the plurality of MACs 114 preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weight bus 116 may function to collect weights and coefficients data input from the one or more periphery controllers 140, 150 and transmit the weights and coefficients data input directly to one or more of the plurality of array cores 110. Accordingly, in some embodiments, multiple array cores 110 may be fed weights and/or coefficients data input via the weights bus 116 in parallel to thereby improve the speed of computation of the array cores 110.

Each array core 110 preferably functions to bi-directionally communicate with its direct neighbors. That is, in some embodiments, a respective array core 110 may be configured as a processing node having a rectangular shape and arranged such that each side of the processing node may be capable of interacting with another node (e.g., another processing node, a data storage/movement node, etc.) that is positioned next to one of the four sides or each of the faces of the array core 110. The ability of an array core 110 to bi-directionally communicate with a neighboring core along each of its sides enables the array core 110 to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file 122. The register file 122 may be configured similar to the register file 112 of an array core 110 in that the register file 122 may function to store large datasets. Preferably, each border core 120 includes a simplified architecture when compared to an array core 110. Accordingly, a border core 120 in some embodiments may not include execution capabilities and therefore, may not include multiplier-accumulators and/or an arithmetic logic unit as provided in many of the array cores 110.

In a traditional integrated circuit (e.g., a GPU or the like), when input image data (or any other suitable sensor data) received for processing compute-intensive application (e.g., neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) is received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set to a default or a predetermined constant value. Additionally, or alternatively, the one or more border cores 120 may be automatically set to a default or a predetermined value when it is detected that no input sensor data or the like is received with a predetermined input data flow to the integrated circuit array 105. Additionally, or alternatively, in one variation, the one or more border cores 120 may be automatically set to reflect values of one or more other border cores having input sensor data when it is detected that no input sensor data or the like is received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Thereby, reducing clock cycles used by the plurality of array core 110 in performing computations on an input dataset.

In a preferred implementation of the integrated circuit 100, the progression of data into the plurality of array cores 110 and the plurality of border cores 120 for processing is preferably based on a predetermined data flow schedule generated at the dispatcher 130. The predetermined data flow schedule enables input data from one or more sources (e.g., sensors, other NN layers, an upstream device, etc.) to be loaded into the border cores 120 and array cores 110 without requiring an explicit request for the input data from the border cores 120 and/or array cores 110. That is, the predetermined data flow schedule enables an automatic flow of raw data from memory elements (e.g., main memory 160) of the integrated circuit 100 to the plurality of border cores 120 and the plurality of array cores 110 having capacity to accept data for processing. For instance, in the case that an array core 110 functions to process a first subset of data of a data load stored in its register file 112, once the results of the processing of the first subset of data is completed and sent out from the array core 110, the predetermined data flow schedule may function to enable an automatic flow of raw data into the array core 110 that adds to the data load at the register file 112 and replaces the first subset of data that was previously processed by the array core 110. Accordingly, in such instance, no explicit request for additional raw data for processing is required from the array core 110. Rather, the integrated circuit 100 implementing the dispatcher 130 may function to recognize that once the array core 110 has processed some amount of data sourced from its register file 112 (or elsewhere) that the array core 110 may have additional capacity to accept additional data for processing.

In a preferred embodiment, the integrated circuit 100 may be in operable communication with an instructions generator 170 that functions to generate computation, execution, and data movement instructions. The instructions generator 170 may be arranged off-chip relative to the components and circuitry of the integrated 100. However, in alternative embodiments, the instructions generator 170 may be cooperatively integrated within the integrated circuit 100 as a distinct or integrated component of the dispatcher 130.

Preferably, the instructions generator 170 may be implemented using one or more general purpose computers (e.g., a Mac computer, Linux computer, or any suitable hardware computer) or general purpose computer processing (GPCP) units 171 that function to operate a compiler module 175 that is specifically configured to generate multiple and/or disparate types of instructions. The compiler module 175 may be implemented using any suitable compiler software (e.g., a GNU Compiler Collection (GCC), a Clang compiler, and/or any suitable open source compiler or other compiler). The compiler module 175 may function to generate at least computation instructions and execution instructions as well as data movement instructions. In a preferred embodiment, at compile time, the compiler module 175 may be executed by the one or more GPCP units 171 to generate the two or more sets of instructions computation/execution instructions and data movement instructions sequentially or in parallel. In some embodiments, the compiler module 175 may function to synthesize multiple sets of disparate instructions into a single composition instruction set that may be loaded into a memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator 170 may function to load the instructions sets into a memory (e.g., memory 160 or off-chip memory associated with the generator 170). In such embodiments, the dispatcher 130 may function to fetch the multiple sets of disparate instructions generated by the instructions generator 170 from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores 110.

In some embodiments, the processing circuitry of the dispatcher 130 includes disparate circuity including a compute instruction generator circuit 132 and a data movement instructions generator circuit 134 (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit 134 into a single instructions composition that combines the disparate outputs.

The single instructions composition generated by the instructions generator 170 and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores 110. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit 134 are preferably separate or independent circuits, in some embodiments the compute instructions generator circuit 132 and the data movement instructions generator circuit 134 may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 is positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 is positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border 120 along the first side of the integrated circuit array 105 to communicably and operably interface with at least one of the first periphery controllers 145 and each border 120 along the second side of the integrated circuit array 105 to communicably and operably interface with at least one of the second periphery controllers 155.

While it is illustrated in at least FIG. 1 that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that is specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that is arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that is arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA transfers may be triggered by a status or operation of one or more of the plurality of array cores 110. For instance, if an array core is completing or has completed a processing of first set of data, the completion or near-completion may trigger the DMA transfers to enable additional data to enter the integrated circuit array 105 for processing.

2. Method for Intelligently Configuring an On-Chip Data Buffer and Scheduling DMA Transfers Involving the On-Chip Data Buffer As shown by way of example in FIG. 2, a method 200 for implementing an intelligently partitioned on-chip data buffer and scheduling a plurality of distinct transfer operations of inputs and outputs in an overlapping manner with computations based on a computation network graph of an application (e.g., a neural network application), may include identifying and/or configuring a computation network graph S210, configuring an on-chip memory with a logical data buffer and allocating storage for inputs and/or outputs of computations (e.g., active and impending) of a computation network graph S220, initializing and enqueuing DMA operations for inputs and outputs and enabling parallelization with computation operations S230, and implementing the intelligently partitioned on-chip data buffer and DMA operations based on the computation network graph S240.

2.1 Configuring a Computation Network Graph

S210, which includes identifying and/or configuring a computation network graph, may function to receive a computation network graph or build a new computation network graph that may graphically illustrate one or more features and/or operations of an application or a program, such as a neural network application/program or the like. As described in more detail herein, in a preferred embodiment, S210 may function to identify a neural network computation graph comprising a plurality of neural network operations, as shown generally by way of example in FIG. 3.

In one or more embodiments, a computation network graph may represent a neural network application and may include nodes and edges which identify points of connections and operation of the network (e.g., a flow of input and outputs of data between nodes (i.e., via edges), a computational flow of input and execution of tasks or computations (e.g., nodes) along the computational flow). In such embodiments, the nodes may represent distinct network operations (or computations (e.g., convolutional operations, neural network operations, etc.)) and edges between nodes may represent dependencies, e.g., inputs and outputs from nodes, between network operations.

Preferably, in one or more embodiments, S210 or a subset of S210 may be performed by a compiler, such as graph compiler. In some implementations, the compiler may reside on or may be implemented by a computing device or on a networked computing device, e.g., server, cloud computing, and/or the like. In such implementations, the compiler may function interactively with an administrator or may be controlled by another application, or a combination thereof. In some implementations, a compiler may be configured to automatically run based on certain conditions such as a lifetime of a network graph, events within a neural network, events happening in other applications, or any other suitable event or condition. Preferably, after reading a computation network graph, a compiler may translate the computation network graph into an intermediate representation (IR) where the IR captures the semantics of the computational network graph of a given application. In one or more implementations, the IR may be used completely or in part for any of the remaining steps, e.g., steps S210, S220, S230 and S240 or any other method or technique described herein.

It shall be recognized that while in one or more preferred embodiments, S210 may function to build or generate a computation network graph, S210 may additionally or alternatively receive a pre-generated computation network graph.

Figure 3:
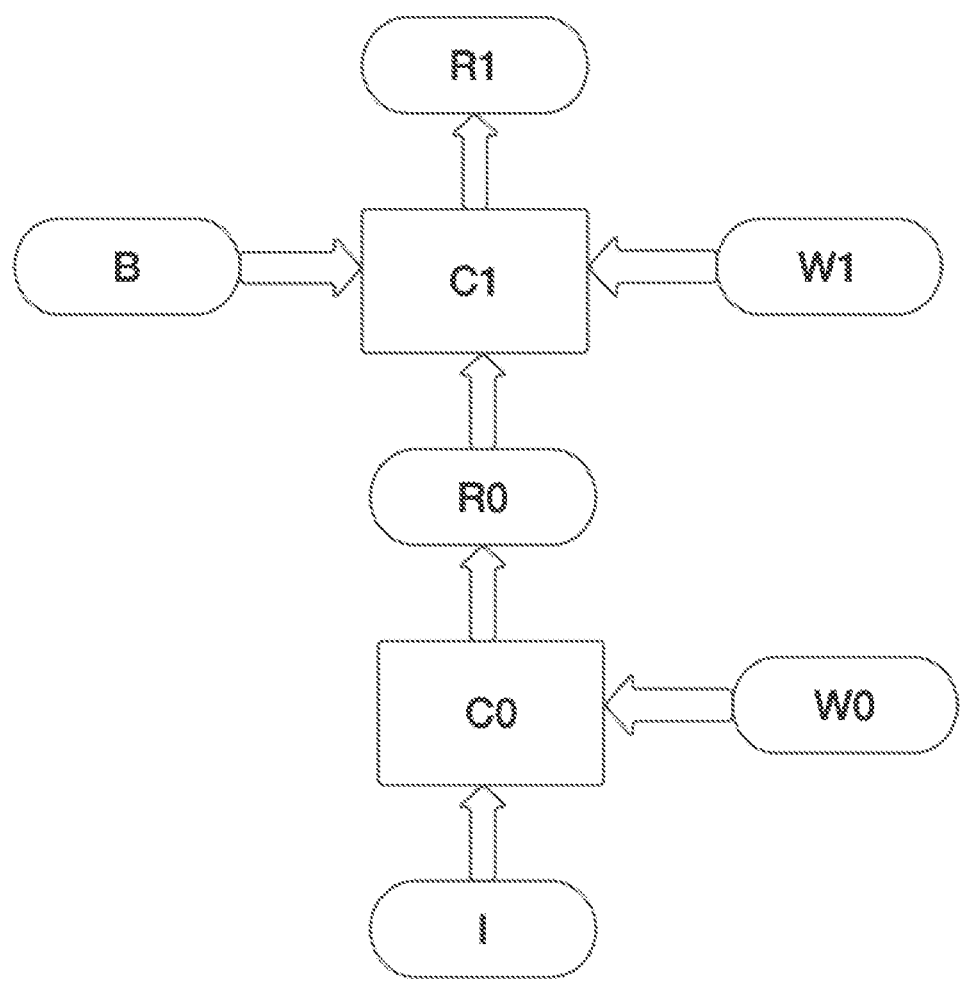
FIG. 3 illustrates a schematic that examples a computation network graph in accordance with one or more embodiments of the present application.
Figure 4:
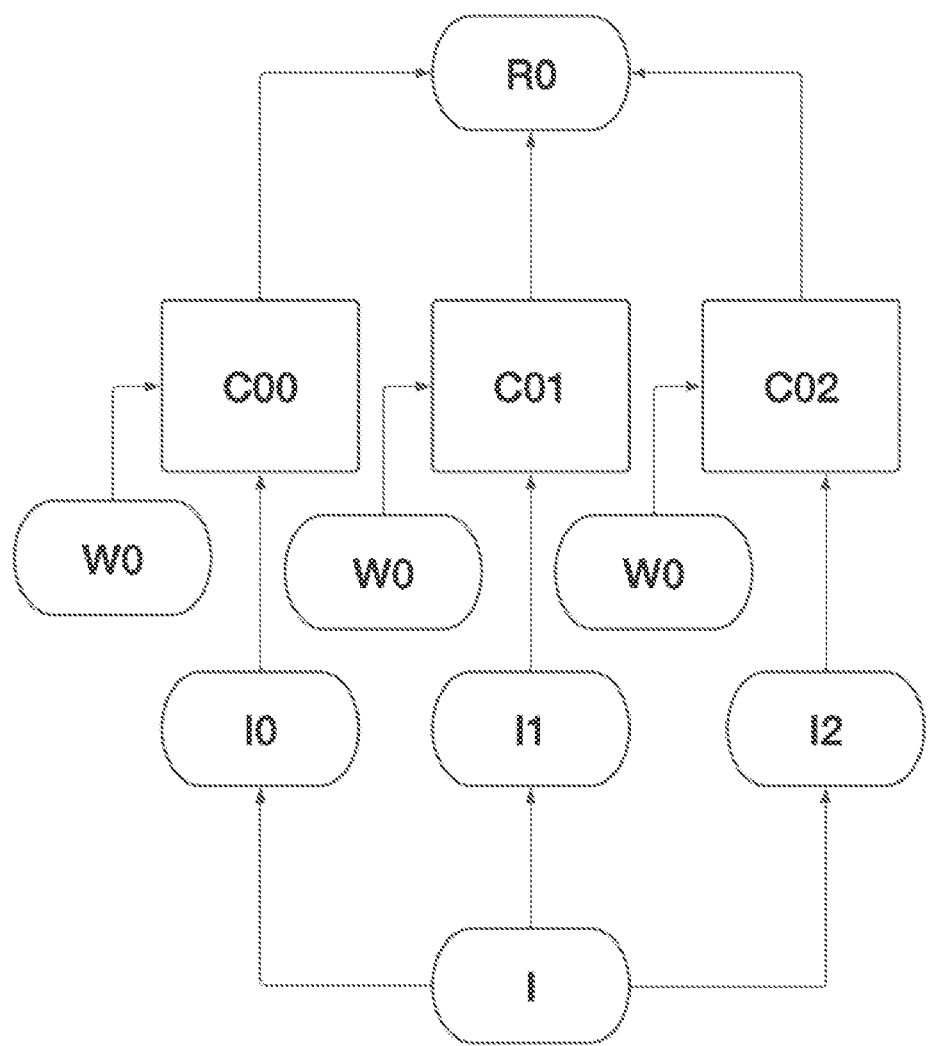
FIG. 4 illustrates a schematic that shows splitting of operations in accordance with one or more embodiments of the present application.

2.12 Computation Network Graph Optimization|Computation Network Graph Splitting S210 includes S212, which includes implementing a computation network graph optimization, may function to generate an optimized computation network graph, wherein, one or more components of the computation network graph may be partitioned or split into multiple components based on attributes of an on-chip data buffer, as shown generally by way of example in FIG. 3 and FIG. 4.

In one or more embodiments, S212 may function to identify when an input of a network operation graph may exceed an input threshold. In one example, an input threshold may relate to a maximum allowable input size or output size into a partition of an on-chip data buffer (e.g., on-chip memory) or the like. Stated differently, in such an example, size of input data (e.g., an image and/or other forms of data) may exceed a size of a partition allocated to the input data on an on-chip memory (e.g., a first distinct sub-region of memory of the on-chip memory, a second distinct sub-region of memory of the on-chip memory) or the like. In such embodiments, S212 may function to partition input data into a plurality of distinct smaller input sizes and may split a network computation correspondingly into smaller operations for computing against each of the plurality of distinct smaller input sizes.

Stated differently, in one or more embodiments, S212 may function to automatically generate an optimized neural network computation graph based on a target or reference neural network computation graph. In such embodiments, automatically generating the optimized neural network computation graph may include splitting at least one component (e.g., input component, computation component, and/or the like) into a plurality of sub-components (e.g., sub-input components, sub-computation components, etc.). The optimized neural network computation graph may be used for one or more downstream steps or processes.

In use, in one or more implementations, a plurality of distinct smaller computation operations may work with slivers of data (e.g., an image and/or other forms of data) which may be obtained by splitting an initial data (e.g., an image and/or other forms of data into a plurality of distinct, smaller sub-inputs), wherein, an initial data may exceed size of on-chip memory.

In a preferred embodiment, S212 may function to split oversized input data (e.g., an image and/or other forms of data) within an n-dimensional tensor object or the like along a height axis of the tensor object that includes the input data. In one or more implementations, splitting along a height axis may have one or more technical benefits, including, but not limited to, enabling a continuous retrieval of data from a main or off-chip or off-tile memory (e.g., a Double Data Rate (DDR) memory). It shall be noted that, in one or more embodiments, S212 may function to split or partition oversized input data along a length axis or width axis of a target tensor object.

Figure 6:
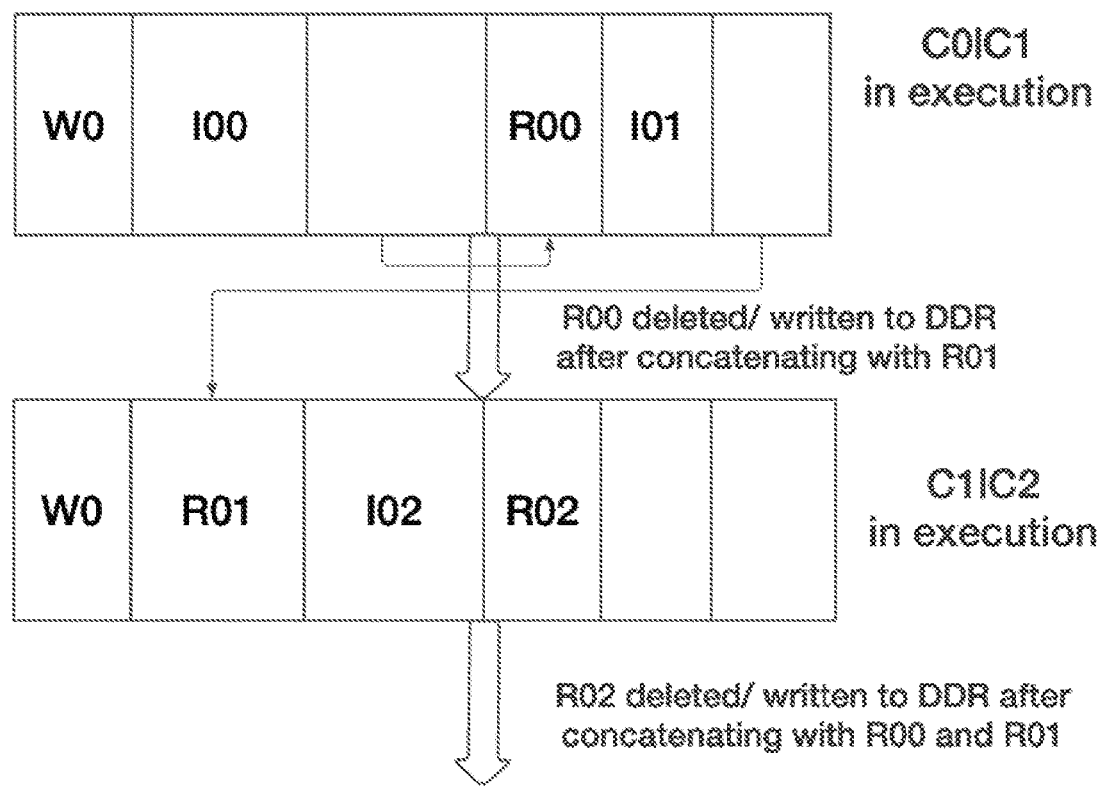
FIG. 6 illustrates a schematic that shows OCM operations with splitting in accordance with one or more embodiments of the present application.

In one or more embodiments, S212 may function to split an input tensor (I) into multiple smaller tensors I0, I1, I2 to In, using a scheduler and may convert a computation (C) into new smaller computations based on or informed by the splitting of input tensor (I). In one or more implementations, partitioned computations C00, C01, C02 to Cn, may be executed sequentially on each part of a partitioned input tensor (I) such that results of each of these computations may be concatenated as a result (R0), as shown generally by way of example in FIG. 3, FIG. 4, and FIG. 6.

2.14 Output Reservation for Subsequent Network Graph-Based Computations

S210 may include S214, which includes output reservation for a subsequent network graph-based computations, may function to reserve output data of an executing or executed branch of a computation network graph as input data for one or more downstream or subsequent branches of the computation network graph. In such embodiments, S214 may function to transfer the reserved output data to a main memory, such as a DDR or the like, of an integrated circuit and preferably store the reserved output data as a reserved or residual tensor or n-dimensional object within the main memory.

Additionally, or alternatively, S214 implementing a task or memory transfer scheduling circuit (i.e., a scheduler) may function to set transfer conditions and/or cause an execution of one or more memory transfers that may function to transfer and/or write the residual tensor that includes the reserved output data from the main memory back into an on-chip memory for use as input data in a downstream or subsequent branch of the computation network graph. Preferably, S214 may function to schedule and cause one or more memory transfers in accordance with the one or more intelligent memory transfer techniques described in at least S220-S240.

2.20 Configuring an On-Chip Memory|Computation Network Graph-Informed Encoding of a Logically Partitioned On-Chip Memory S220, which includes configuring a logical architecture of an on-chip data buffer, may function to partition or allocate the on-chip data buffer based on a description of a computation network graph (e.g., a neural network computation graph or the like). That is, in one or more embodiments, a configuration of the computation network graph for a given algorithm or program that may be executed by an integrated circuit (e.g., integrated circuit 100, one or more processing cores of an array of processing cores of the integrated circuit, etc.) may inform a partitioning and/or encoding of a target on-chip data buffer for storing prerequisite computational components, distinct data elements and/or tensors in distinct physical sections of the on-chip data buffer required for a target computation or compute scope. For instance, in a non-limiting example, for each computation component of a computation network graph, S220 may function to allocate a distinct storage or memory section of an on-chip data buffer for each distinct input component or input tensor required by and each output component or output tensor produced by a given computation component of the computation network graph.

In a preferred embodiment, the on-chip data buffer comprises a logical double buffer. That is, in such preferred embodiment, the on-chip data buffer comprises a designated region of memory in which the designated region of memory includes at least a first sub-region and a second sub-region that may each function to store inputs and outputs associated with at least two distinct computations (or compute scopes) of the computation network graph. In one or more alternative embodiments, the on-chip data buffer includes a plurality of distinct logical partitions that maps or corresponds to a plurality of physical memory banks, respectively.

In one or more embodiments, S220 may function to (e.g., logically) partition one or more on-chip data buffers of the integrated circuit based on compute scopes associated with a subject computation graph. In one or more embodiments, a compute scope may be a generalization of a target layer. For instance, in a non-limiting example, a compute scope may include computer operations on top of a layer computation (e.g., a convolution), such as, but not limited to, quantization for biases, activation for biases, etc. Additionally, in one or more embodiments, the compute scope may include one or more additional convolutions (e.g., chaining of operations) if the data is within a target format or may be modified (e.g., below a complexity threshold) to the target format within an OCM. In one or more embodiments, S220 may function to (e.g., logically) partition a target on-chip data buffer of the integrated circuit into n-number of distinct logical partitions (e.g., one (1), two (2), three (3), four (4), etc.) based on n-number of target compute scopes and/or memory allocations of the OCM.

In one or more implementations, the on-chip data buffer may be referred to herein as an "on-chip memory" (OCM); these terms may be used interchangeably without departing from intended scope of the method 200.

2.22 Coarse Partitioning/Encoding of an OCM

S220 includes S222, which includes a coarse partitioning of an OCM, may function to encode a first logical partition or region of an OCM for an actively executing or current computation component or compute scope of a computation network graph and encode a second part of an OCM for a subsequent or an impending computation component or compute scope of the computation network graph. Preferably, the active computation component and the impending computation component of the computation network graph are computations that appear in series within the computation network graph and/or that may be scheduled in a serial manner such that an execution of the active computation component (e.g., active compute scope of the like) and the impending computation component (e.g., impending compute scope) is performed in series or succession (e.g., one after the other). Accordingly, in such embodiments, an encoding and/or allocation of a target OCM in S222 may be informed by or otherwise based on attributes of a target computation network graph or the like and/or arrangement of the computation components therein.

In one or more embodiments, S222 may function to encode a first logical partition or region of an OCM for an actively executing or current computation component of a computation network graph, a second logical partition or region of an OCM for a subsequent or an impending computation component of the computation network graph, and a third logical partition or region of an OCM for a further subsequent or a further impending computation component of the computation network graph. It shall be noted that S222 may function to encode n-number of logical partitions for a target quantity of active and subsequent computations in view of memory capacity/allocations of the OCM to maximize an overlap between data transfers and computations by pre-fetching data.

In one or more embodiments, a first part of the OCM may be encoded such that a collection of inputs of a given active or currently executing computation component (or compute scope) may be allocated storage and written into the first part of the OCM while a second part of the OCM may be encoded such that a collection of inputs of a given impending (i.e., not yet active) computation component (or compute scope) may be allocated storage and transferred or written into the second part of the OCM in parallel with the transfers of the inputs of the first part of the OCM.

In one or more embodiments, a subject computation network graph may include a plurality of distinct computation components or computation sections. In one or more implementations, one or more distinct computation components or branches of a computation network graph may include one or more distinct (raw or processed) data inputs and one or more of a distinct set of weights, constants, and/or biases of the respective computation component. Stated differently, in some embodiments, a distinct computation component may include a distinct computation node (e.g., a convolution neural network computation, etc.) and at least one distinct input node (e.g., input data) that may be consumed by the distinct computation node, at runtime.

In one example, a subject computation network graph may include a plurality of distinct computation components or branches in which one of the branches includes a first computation component (C0) and a second computation component (C1). In some implementations, with respect to a target computation network graph, C0 may be ordered before or prior to C1, therefore, at runtime, C0 may be considered an active or current computation while C1 may be considered a subsequent or impending computation for execution.

It shall be noted that, while it is generally described that the OCM may be a logical double buffer or the like, in some embodiments, the OCM may be logically partitioned to include more than two independent regions. For example, in some embodiments, an OCM may be logically partitioned to include more than two logical regions to increase a capacity for executing DMAs (e.g., memory transfers) for more than two distinct computation components of a computation network graph, as described in more detail herein.

2.24 Memory Allocations (Sub-Partitions) Within Each Logical (Coarse) Partition of an OCM|Graph-Based I/O Allocations of an OCM S220 includes S224, which includes granular allocations (sub-partitions) of memory regions within a coarse logical partition of an OCM, may function to allocate, within a first logical partition of an OCM, regions of memory for computation inputs and/or outputs for a first or active computation component (or compute scope) of a computation network graph and allocate regions of memory within a second logical partition of the OCM, computation inputs and/or outputs for a second computation component (or compute scope) of the computation network graph. Accordingly, in a preferred embodiment, S224 may function to identify and allocate regions of memory within a given logical partition based on attributes of a target computation network graph and in some embodiments, based on the required inputs and/or produced outputs illustrated on the target computation network graph.

In one implementation, the granular allocations within a given logical partition of OCM comprise a subdivision into memory slices of a coarse memory region of the logical partition of the OCM. In such implementation, the memory region for each memory slice is preferably smaller than a size of the coarse memory region of the logical partition. S224 may function to encode each memory allocation or memory slice to a distinct type of input illustrated or otherwise, described in a target computation network graph.

Figure 5:
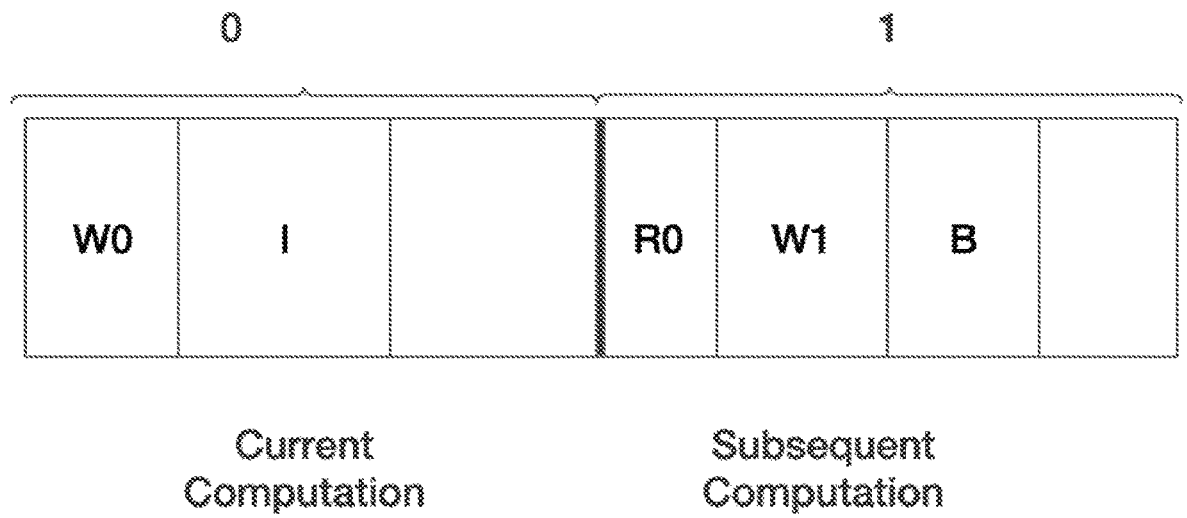
FIG. 5 illustrates a schematic that shows OCM partitioning in a logical double buffer in accordance with one or more embodiments of the present application.

In one example, S224 may function to configure a first logical partition of an OCM by allocating memory slices for a computation component, C0, within the first logical partition of the OCM, input(s) such as an input data tensor (e.g., I0), weight(s) tensor or coefficient(s) (W0), one or more constants or biases (B), as shown generally by way of example in FIG. 5. In this example, S224 may additionally or alternatively allocate memory slices for one or more results (R1) of a preceding computation component C0-1 of a subject computation network graph in the case that the results of the computation of component C0-1 may be used as input into a downstream computation C0, as shown generally by way of example in FIG. 5 and FIG. 6. Additionally, or alternatively, in one or more embodiments, S224 may function to configure a first logical partition of an OCM by allocating memory slices for a computation component, C1, within a second logical partition of the OCM input(s) such as an input data tensor (I1), weight(s) tensor or coefficient(s) (W1), one or more constants or biases (B). S224 may additionally or alternatively allocate memory slices for one or more results (R0) of the computation component C0 of the computation network graph in the case that the results of the computation of component C0 may be used as an input into the computation C1.

As mentioned above, in one or more embodiments, results (R0) of a first computation (C0) may be an input to a subsequent or impending computation (C1). In such embodiments, S224 may function to allocate a memory slice for storing the results (R0) of an active/current computation (C0) in the coarse logical partition or memory region configured for storing the input components for the computation C0. An arrangement of the resulting data (R0) produced by an active or current computation into a distinct logical (coarse) partition for an impending computation is preferably based on or informed by one or more attributes or characteristics of the computation network graph.

Additionally, or alternatively, S224 may function to sub-partition active/current and subsequent/pending computation partitions to allocate a separate distinct space for a plurality of inputs, weights, biases and results in each partition. In such embodiments, sub-partitioning or slicing of coarse partitions (e.g., a first logical partition and a second logical partition) may relate to a reservation, within a coarse partition of an OCM, of a distinct region for a distinct input data element that may be required for a given computation and/or for an output of a given computation of a computation network graph. In one or more embodiments, allocation of space for individual inputs of a given computation partition may be implemented simultaneously in both active/current and subsequent/pending computation partitions of an OCM. In some implementations, in a subsequent computation partition, storage space may be allocated for one or more results from an active/current computation (or compute scope) or a previous computation (or compute scope), if these results may be used as inputs for a subsequent/pending computation (or compute scope).

It shall be noted that, in one or more embodiments, a target physical bank of the OCM may map or correspond to a target logical partition of the OCM. For instance, in a non-limiting example, a first logical partition of the OCM may map to a first memory bank of the OCM. Additionally, or alternatively, in the same or another non-limiting example, a second logical partition of the OCM may map to a second memory bank of the OCM.

2.3 Initializing & Enqueuing DMA Transfer Operations and Parallelization With Computation Operations S230, which includes initializing and enqueuing a plurality of distinct memory transfer operations, may function to initialize a plurality of distinct direct memory accesses DMAs based on memory allocations within the OCM and based on computations of the computation network graph and/or compute scopes associated with the computation network graph. In some embodiments, S230 may function to schedule the plurality of DMA transfer operations of inputs and outputs between an OCM and a main memory (e.g., off-chip or off-tile memory) in a manner that enables an overlapping execution of computations and data transfer operations. In this way, one or more inputs for an impending computation (or compute scope) may be enqueued within or transferred into the OCM while one or more inputs for an active computation (or compute scope) within the OCM may be consumed in an active computation thereby reducing latencies in data transfer and computation operations.

In a preferred embodiment, S230 may function to initialize a first set of DMA transfer operations based on input/output allocations within an OCM for an active/current computation (or compute scope) and enqueue a second set of DMA transfer operations based on input/output allocations within the OCM for a subsequent/impending computation (or compute scope). In such preferred embodiments, S230 may function to implement or perform a second set of DMA transfer operations for the subsequent/impending computation (or compute scope) such that it overlaps with an active/current computation operation (or compute scope). In analogous ways, S230 may function to initialize a third set of DMA transfer operations or iteratively initialize n-number of DMA transfer operations based on input/output allocations within the OCM for target computations (or compute scopes) succeeding the subsequent/impending computation.

In a preferred embodiment, DMA transfer operations for a subsequent/impending computation may be processed in parallel with a current/active computation, during run time. In one or more embodiments, S230 may function to create a first set of DMA transfer operations to transfer inputs (I) and weights (W) into a first logical partition of an OCM while enqueuing, in parallel, a second set of DMA transfer operations to transfer inputs, weights and/or biases to a second logical partition of the OCM.

Accordingly, the method 200 may function to satisfy and/or anticipate input dependencies of computation operations along a computation network graph before input data is required by a given computation operation based on the enqueuing and initializations of DMA transfer operations. In one example, S230 may function to satisfy dependencies of computation operation C0 by completing transfers of inputs (I) and weights (W0) into memory slice regions of a first logical partition of the OCM. In such implementations, as soon as inputs (I) and weights (W0) are transferred into the first logical partition, the computation operation C0 may start and in parallel weights (W1) and biases (b) may be transferred from a DDR or main memory into the second logical partition of the OCM for an impending computation operation C1, as shown generally by in FIG. 3-FIG. 6. Additionally, or alternatively, as soon as computation operation C0 may be completed, the impending computation operation C1 may start since data required for executing the computation operation C1 was previously transferred into the second logical partition of the OCM contemporaneous with an execution of the computation operation C0.

In one or more embodiments, initialization of DMA transfer operations may be based on or informed by one or more sections of a computation network graph. In one or more implementations, DMA transfer operations corresponding to an active/current computation partition may be started first and DMA transfer operations corresponding to a subsequent/impending computation partition may be enqueued for processing later.

Additionally, or alternatively, in one or more embodiments, S230 may function to provide systems and techniques such that a computation operation may need only partial completion of a DMA transfer operation to start. In one or more implementations, starting a computation with only partial DMA transfer of input data may be possible because a computation may have iterative and/or repetitive programming elements (e.g., a loop etc.), wherein, each iteration/repetition may require different parts of input data and thus, a partial DMA may be sufficient to satisfy at least one dependency of the computation operation thereby allowing the computation operation to begin processing with partial data.

2.4 Implementing an Intelligently Configured OCM and DMA Transfer Based on a Computation Network Graph S240, which includes implementing a plurality of DMA transfers based on an intelligently allocated on-chip data buffer, may function to create and/or execute a plurality of DMA transfers between a main memory (e.g., a DDR) and an OCM preferably based on network graph-based memory allocations within two or more logical partitions of the OCM.

In one or more embodiments, to optimize a prefetching of layer computational components (e.g., input computational components, prerequisite computational components, required layer computational components, or the like) for downstream computations associated with a subject neural network graph, S240 may function to execute one or more DMA transfers (or a plurality of DMA transfers) during an active or upstream layer computation associated with a target upstream layer of the subject neural network graph.

For instance, in a non-limiting example, S240 may function to execute one or more DMA transfers that may write or transfer a first set of computational components (e.g., a first set of layer weights of a target downstream layer) to the OCM that may be required for a downstream computation (associated with the target downstream layer) while an active or upstream layer computation may be occurring via the integrated circuit. In another non-limiting example, S240 may function to execute one or more DMA transfers that may write or transfer at least a first set of computational components (e.g., a first set of layer weights of a first, distinct target downstream layer of a subject computation graph, etc.) and a second set of computational components (e.g., a second set of layer weights of a second, distinct target downstream layer of the subject computation graph, etc.) to one or more distinct logical partitions of the OCM while an active or upstream layer computation may be occurring via the integrated circuit. In another non-limiting example, S240 may function to execute one or more DMA transfers that may write or transfer at least a first set of computational components (e.g., a first set of layer weights of a first, distinct target downstream layer of a subject computation graph) and a second set of computational components (e.g., a second set of layer weights of a second, distinct target downstream layer that may be downstream of a current layer computation by one or more layers (e.g., one (1) layer, two (2) layers, three (3) layers, four (4) layers, five (5) layers, six (layers), seven (7) layers, or any number of layers) to one or more distinct logical partitions of the OCM while an active or upstream layer computation may be occurring via the integrated circuit. That is, in one or more embodiments, while a current computation (C0) associated with a first layer of the neural network is ongoing via the integrated circuit, S240 may function to execute one or more DMA transfers that may write and stores a set of computation components (e.g., weights, etc.) corresponding to a downstream layer (e.g., a seventh layer) and initially bypass or jump storing computation components for layers in between the first layer and the downstream layer. It shall be noted in such non-limiting examples a prefetch distance may be determined by a tensor computation compiler or the like.

2.42 DMA Transfers to a $1^{st}$ Logical Partition of an OCM to Initiate Computation S240 includes S242, which may function to initialize one or more DMA transfers to an OCM based on memory allocations and/or an encoding of one or more logical partitions of the OCM. In one or more embodiments, each distinct memory allocation within each of two or more logical partitions of the OCM may be mapped or otherwise, corresponds to a distinct DMA of a plurality of scheduled DMAs. Stated another way, in one or more embodiments, each of the two or more logical partitions of the OCM may be mapped or otherwise, configured to receive pre-requisite computation components required for a target layer computation or target computation or target compute scope.

In a first implementation, at a start of processing of data by an integrated circuit (e.g., integrated circuit 100), S242 may function to initiate one or more of a first set of DMAs for transferring input data or the like into a first logical memory partition of the OCM for executing at least a first computation (e.g., C0) based on a plurality of distinct memory allocations within the first logical memory partition of the OCM.

Additionally, or alternatively, the OCM in a preferred embodiment may include multiple logical memory partitions (e.g., a first logical part, a second logical part, etc.), as described in S220-S230. In such implementation, the inputs into and computation outputs of each of a plurality of distinct computations of a given algorithm or application, as sometimes illustrated by a computation network graph or the like, may be allocated or encoded to distinct memory regions of the OCM.

Accordingly, in the circumstance that a current or active computation, exampled by C0, includes multiple distinct inputs for its computation, S240 may function to initialize and execute multiple DMAs in parallel or serially that may include memory transfers from a main memory (e.g., a DDR) for each of the multiple distinct inputs into the OCM. In such implementation, each distinct input (tensor) for the current computation may be allocated to a distinct memory region of a first logical partition of the OCM.

Partial Dependency Enforcement

In some embodiments, one or more of a set of DMAs for transferring input into a logical partition of an OCM may be encoded with or may be accompanied with instructions for setting or enforcing one or more dependencies. For example, a transfer or copy instruction, when executed, that initiates a DMA transfer from a main memory to one or more memory regions within a logical partition of an OCM may set a hidden dependency that may be enforced by hardware circuitry or the like. In such example, during an execution of the DMA transfer to the OCM, once a partial amount of memory (but not all) sufficient to fill or that satisfies a memory capacity of a data processing tile or group of processing circuits (e.g., integrated circuit array 105) has been transferred during the DMA transfer, a computation dependency for starting or initiating a computation with may be satisfied thereby causing the data processing tile or group of processing circuits to begin computations against the partial amount of memory.

Serial Chaining of DMAs

It shall be noted that, in one or more embodiments, a set of DMAs being executed for a given logical partition of the OCM may be serially chained together. In such embodiments, serially chaining the set of DMAs may cause a DMA engine or other DMA execution circuit to automatically and serially execute each of the DMAs in the set, such that the DMAs in the set are executed one after another until all the DMAs within the set for filling the memory allocations within the given logical partition of the OCM are filled. Additionally, or alternatively, it shall be noted that distinct sets of DMAs for distinct logical partitions of the OCM may also be chained together. For example, a first serially chained set of DMAs for a first logical partition of an OCM may be chained together with a second serially chained set of DMAs for a second logical partition of the OCM.

2.44 Enqueuing DMA Transfers for $2^{nd}$ Logical Partition of OCM

S240 includes S244, which includes enqueuing a plurality of distinct DMAs, may function to enqueue a second set of DMAs for a second logical partition while or during a start or execution of a first set of DMAs for a first logical partition (as described in S242). Accordingly, in a parallel fashion, S244 implementing a DMA engine or the like may function to execute a set of active DMA transfers for a first logical partition of an OCM and enqueue a set of DMA transfers for a second logical partition of the OCM. In this way, once the first set of DMA transfers into the first logical partition of the OCM is completed, S244 may function to automatically start the set of DMA transfers for the second logical partition of the OCM thereby reducing latency in memory transfers since the second set of DMA transfers may be made ready for immediate execution at the completion of the first set of DMA transfers.

2.46 Parallel Read Out of and Memory Transfers to Logical Partitions of OCM

S240 includes S246, which includes a simultaneous and/or parallel read/write operations of a logically partitioned OCM, may function to enable read out of a first logical partition of an OCM in parallel with one or more DMA transfers into a second logical partition of the OCM. In a preferred embodiment, S246 may function to cause an execution of one or more or a set of DMA transfers that may be enqueued for a second logical partition of an OCM based on a completion of a set of DMA transfers for a first logical partition of the OCM and/or during a consumption of memory from a first logical partition of the OCM by one or more computations.

In some embodiments, during an execution of the one or more computations, S246 may function to write into the second logical partition of the OCM the computation results into a dedicated allocated memory region for outputs of the computation while or in parallel with the writes into the second logical partition of the OCM of the second set of DMA transfers.

Additionally, or alternatively, S246 may function to delete input objects (tensors) and weight objects (tensors) and/or write out results within the first logical partition of the OCM based on a completion of the one or more computations associated with the input data stored within the first logical partition of the OCM.

S240 may function to automatically and continuously execute and/or iteratively execute one or more distinct sets of DMAs and, in parallel manner, enqueue one or more additional sets of DMAs for a target logically partitioned OCM in accordance with a sequence of operations in a network graph until the sequence of operations in the network graph is complete.

Cycle Aware Estimation

In one or more embodiments, S240 may function to continuously execute and/or iteratively execute one or more distinct sets of DMAs that may write and/or enqueue computational components into one or more logical partitions of the OCM based on a predicted or estimated number of clock cycles computed for a target active or current computation and/or the estimated number of clock cycles that may be required to transfer or write the computational components associated with one or more DMA transfers to the OCM. Stated differently, the predicted or estimated number of clock cycles computed for a target active or current computation may inform one or more steps of the method 200 on the amount or size of data that can be wrote or transferred to the OCM.

For instance, in a non-limiting example, the integrated circuit 100 implementing the method 200 may function to predict or forecast a number of clock cycles that a target compute scope or convolution may require to run on the integrated circuit 100. Additionally, or alternatively, in one or more embodiments, the integrated circuit 100 implementing the method 200 may function to estimate the number of clock cycles for the first set of DMA transfers, a second set of DMA transfers, and/or n-number of target DMA transfers that may be required to transfer or write the computational components to the OCM (e.g., one or more target logical partitions of the OCM).

In one or more embodiments, if the integrated circuit 100 implementing the method 200 predicted that a target compute scope or convolution may exceed a threshold number of clock cycle during an execution on the integrated circuit, S240 may function to optimize the prefetching of data (e.g., computational components) by executing multiple DMA transfers (e.g., the first set of DMA transfers and the second set of DMA transfers, fetching multiple data items) to store in the OCM to maximize an overlap between computations by the integrated circuit and memory transfers as described above. In one or more embodiments, if the integrated circuit 100 implementing the method 200 predicted that a plurality of sequential compute scopes or convolutions may not exceed a threshold number of clock cycle during an execution on the integrated circuit, S240 may function to optimize the prefetching of data by executing one or more DMA transfers that maximizes or optimizes an overlap with the plurality of computation scopes or convolutions.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method of accelerating memory transfers of data and computation efficiency within an integrated circuit, the method comprising:
   implementing the integrated circuit comprising (1) an array of processing cores, (2) an on-chip data buffer in operable communication with the array of processing cores, and (3) an off-chip main memory in operable communication with the on-chip data buffer;
   configuring a region of memory of the on-chip data buffer based on at least one attribute of a neural network computational graph, wherein configuring the region of memory includes:
   (a) partitioning the region of memory of the on-chip data buffer to include a first distinct sub-region of memory configured to receive prerequisite computational components for a target active computation associated with the neural network computational graph; and
   (b) partitioning the region of memory of the on-chip data buffer to include a second distinct sub-region of memory configured to receive prerequisite computational components for an impending computation succeeding the target active computation of a predetermined sequence of computations;
   initializing, by a memory transfer scheduling circuit, a plurality of distinct memory transfer operations from the off-chip main memory to the on-chip data buffer based on an encoding of the neural network computational graph and memory attributes of the on-chip data buffer;
   executing a first set of memory transfer operations of the plurality of distinct memory transfer operations that includes writing a first set of prerequisite computational components to the first distinct sub-region of memory, wherein writing the first set of prerequisite computational components to the first distinct sub-region of memory causes the integrated circuit to execute, by at least one processing core of the array of processing cores, a leading computation associated with the first set of prerequisite computational components, and while executing the leading computation, simultaneously executing a second set of memory transfer operations of the plurality of distinct memory transfer operations to accelerate an enqueuing of a second set of prerequisite computational components within the second distinct sub-region of memory for the impending computation.

2. The method according to claim 1, wherein:

the first set of prerequisite computational components includes (i) an input component and (ii) a distinct set of weights associated with a target layer of the neural network computational graph, and in response to writing the input component and the distinct set of weights to the first distinct sub-region of memory of the on-chip data buffer:
  executing, by the at least one processing core of the array of processing cores, the leading computation based on the input component and the distinct set of weights.

3. The method according to claim 1, further comprising:

sub-partitioning the first distinct sub-region of memory of the on-chip data buffer into a plurality of distinct memory slices, wherein each distinct memory slice of the plurality of distinct memory slices corresponds to a distinct prerequisite computational component type.

4. The method according to claim 3, wherein:

a first memory slice of the plurality of distinct memory slices is allocated to receive an input-type prerequisite computational component, wherein the input-type prerequisite computational component comprises a n-dimensional tensor of input data, and a second memory slice of the plurality of distinct memory slices is allocated to receive a weight-type prerequisite computational component, wherein the weight-type prerequisite computational component comprises a distinct set of weights associated with a target layer of the neural network computational graph.

5. The method according to claim 1, further comprising:

sub-partitioning the first distinct sub-region of memory of the on-chip data buffer into a plurality of distinct memory slices, wherein:

a first memory slice of the plurality of distinct memory slices is allocated to receive a prerequisite computational component type of a first type, a second memory slice of the plurality of distinct memory slices is allocated to receive a prerequisite computational component type of a second type distinct from the first type, and a third memory slice of the plurality of distinct memory slices is allocated to receive a prerequisite computational component type of a third type distinct from the first type and the second type.

6. The method according to claim 1, further comprising:

computing an n-dimensional output data tensor based on the executing, by the at least one processing core of the array of processing cores, the leading computation; and in response to computing the n-dimensional output data tensor:
  writing the n-dimensional output data tensor to the second distinct sub-region of memory of the on-chip data buffer, and
  executing, using one or more processing cores of the array of processing cores, the impending computation based on the n-dimensional output data tensor and the second set of prerequisite computational components required for the impending computation.

7. The method according to claim 1, wherein:

a majority of the second set of prerequisite computational components required for the impending computation is stored within the second distinct sub-region of the on-chip data buffer prior to a completion of the leading computation, and the storing of the majority of the second set of prerequisite computational components minimizes a latency between a completion of the leading computation and a start of the impending computation by one or more processing cores of the array of processing cores.

8. The method according to claim 7, further comprising:

in response to a completion of the impending computation via the one or more processing cores of the array of processing cores:

removing or deleting one or more prerequisite computational components of the second set of prerequisite computational components from the second distinct sub-region of memory of the on-chip data buffer.

9. The method according to claim 1, wherein:

each prerequisite computational component of the second set of prerequisite computational components is encoded in the second distinct sub-region of memory of the on-chip data buffer prior to the at least one processing core of the array of processing cores completing the leading computation.

10. The method according to claim 1, further comprising:

in response to a completion of the leading computation using the at least one processing core of the array of processing cores:

removing or deleting one or more prerequisite computational components of the first set of prerequisite computational components from the first distinct sub-region of memory of the on-chip data buffer.

11. A method of intelligently controlling a flow of data within an integrated circuit, the method comprising:

identifying a representation of a neural network computation graph comprising a plurality of neural network operations;

configuring an on-chip data buffer based on the neural network computation graph, wherein configuring the on-chip data buffer includes:
  partitioning a region of memory of the on-chip data buffer to include a first distinct sub-region of memory configured to receive computational components for a target compute scope associated with the neural network computation graph; and
  partitioning the region of memory of the on-chip data buffer to include a second distinct sub-region of memory configured to receive computational components for a succeeding compute scope in a predetermined sequence of computation scopes associated with the plurality of neural network operations;

executing a first set of memory transfer operations that writes a first set of computational components to the first distinct sub-region of memory, wherein writing the first set of computational components to the first distinct sub-region of memory causes the integrated circuit to execute, by at least one processing core of an array of processing cores, the target compute scope based on at least a subset of the first set of computational components, and while executing the target compute scope, simultaneously executing a second set of memory transfer operations that accelerates an enqueuing of a second set of computational components by writing the second set of computational components to the second distinct sub-region of memory required for the succeeding compute scope.

12. The method according to claim 11, further comprising:
automatically generating an optimized neural network computation graph based on the neural network computation graph, wherein automatically generating the optimized neural network computation graph includes splitting at least one computation component of the neural network computation graph into a plurality of distinct sub-computations, and
the representation of the neural network computation graph comprises the optimized neural network computation graph.

13. The method according to claim 11, wherein:
the first set of computational components includes (i) an input component, (ii) a first distinct set of weights associated with a first target layer of the neural network computation graph, and (iii) a second distinct set of weights associated with a second target layer downstream of the first target layer.

14. The method according to claim 11, further comprising:
computing an n-dimensional output data tensor based on the executing, by the at least one processing core of the array of processing cores, the target compute scope; and
in response to computing the n-dimensional output data tensor:
writing the n-dimensional output data tensor to the second distinct sub-region of memory of the on-chip data buffer, and
based on the writing, executing, using one or more processing cores of the array of processing cores, the succeeding compute scope based on the n-dimensional output data tensor and the second set of computational components.

15. A method of intelligently controlling a flow of data within an integrated circuit, the method comprising:
identifying a neural network computation graph;
configuring an on-chip data buffer based on the neural network computation graph, wherein configuring the on-chip data buffer includes:
partitioning a region of memory of the on-chip data buffer to include a first distinct sub-region of memory configured to receive prerequisite computational components for a target computation associated with the neural network computation graph; and
partitioning the region of memory of the on-chip data buffer to include a second distinct sub-region of memory configured to receive prerequisite computational components for an impending, non-active computation succeeding the target computation;
executing a first set of memory transfer operations that writes a first set of prerequisite computational components to the first distinct sub-region of memory,
wherein writing the first set of prerequisite computational components to the first distinct sub-region of memory causes the integrated circuit to execute, by at least one processing core of an array of processing cores, the target computation based on, at least, the first set of prerequisite computational components, and
while executing the target computation, simultaneously executing a second set of memory transfer operations that writes a second set of prerequisite computational components to the second distinct sub-region of memory for the impending, non-active computation.

16. The method according to claim 15, wherein
the on-chip data buffer is in operable communication with the array of processing cores.

17. The method according to claim 15, wherein:
the first set of prerequisite computational components includes (i) an input component and (ii) a distinct set of weights associated with a target layer of the neural network computation graph, and
in response to writing the input component and the distinct set of weights to the first distinct sub-region of memory of the on-chip data buffer:
executing, by the at least one processing core of the array of processing cores, the target computation based on the input component and the distinct set of weights.

18. The method according to claim 15, further comprising:
computing an output data tensor based on the executing, by the at least one processing core of the array of processing cores, the target computation;
in response to computing the output data tensor, writing the output data tensor to the second distinct sub-region of memory of the on-chip data buffer; and
in response to writing the output data tensor to the second distinct sub-region of memory of the on-chip data buffer, executing, using one or more processing cores of the array of processing cores, the impending, non-active computation based on the output data tensor and the second set of prerequisite computational components.

19. The method according to claim 15, wherein:
the writing of each prerequisite computational component of the second set of prerequisite computational components to the second distinct sub-region of memory of the on-chip data buffer is finished prior to a completion of the leading computation by the at least one processing core of the array of processing cores.

20. The method according to claim 15, wherein:
a majority of the second set of prerequisite computational components required for the impending, non-active computation is stored within the second distinct sub-region of the on-chip data buffer prior to a completion of the target computation, and
the storing of the majority of the second set of prerequisite computational components minimizes a latency between a completion of the target computation and a start of the impending, non-active computation by the array of processing cores.

* * * * *